(12) United States Patent
Hu et al.

(10) Patent No.: US 8,118,335 B2
(45) Date of Patent: Feb. 21, 2012

(54) COVER LATCH MECHANISM AND PORTABLE ELECTRONIC DEVICE USING SAME

(75) Inventors: Chia-Wei Hu, Taipei Hsien (TW); Chih-Chiang Chang, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 710 days.

(21) Appl. No.: 12/212,741

(22) Filed: Sep. 18, 2008

(65) Prior Publication Data

US 2009/0289462 A1 Nov. 26, 2009

(30) Foreign Application Priority Data

May 23, 2008 (CN) .......................... 2008 1 0301749

(51) Int. Cl.
*E05B 15/00* (2006.01)
(52) U.S. Cl. .. 292/254; 292/209; 292/303; 292/DIG. 16
(58) Field of Classification Search .................. 292/254, 292/240–241, 202–204, 207, 209 X, 210, 292/253, 302, 304, 303 X, 341.14, 341.15, 292/341.17, DIG. 11, DIG. 12, DIG. 16 X
See application file for complete search history.

(56) References Cited

U.S. PATENT DOCUMENTS

| 4,958,864 | A | * | 9/1990 | Fischer et al. | 292/19 |
| 5,578,794 | A | * | 11/1996 | Lamb et al. | 174/535 |
| 6,394,300 | B1 | * | 5/2002 | Bosy | 220/326 |
| 7,338,096 | B2 | * | 3/2008 | Si et al. | 292/137 |
| 7,762,738 | B2 | * | 7/2010 | Homner | 403/315 |
| 7,855,884 | B2 | * | 12/2010 | Dong | 361/679.58 |
| 7,885,064 | B2 | * | 2/2011 | Chen et al. | 361/679.58 |
| 2009/0290304 | A1 | * | 11/2009 | Shen et al. | 361/679.58 |

* cited by examiner

*Primary Examiner* — Thomas A Beach
*Assistant Examiner* — Mark Williams
(74) *Attorney, Agent, or Firm* — Altis Law Group, Inc.

(57) ABSTRACT

A cover latching mechanism (100) used in a portable electronic device is described including a latching base (20), a cover member (10), a latching member (40), and a releasing member (30). The cover member has a latching protrusion (14) arranged on it. The latching member is used to latch the cover member to the latching base and defines a latch space (464) and a release space (462). The cover member can be latched to the latching base by latching the latching protrusion into the latch space, and then be released from the latching base by the releasing member engaging into the release space.

10 Claims, 4 Drawing Sheets

COVER LATCH MECHANISM AND PORTABLE ELECTRONIC DEVICE USING SAME

BACKGROUND

1. Field of the Invention

The invention relates to cover latch mechanisms used in portable electronic devices.

2. Description of Related Art

Portable electronic devices usually include latch mechanisms to latch covers (such as battery covers) to housings. The latch mechanism tolerates frequent installation and removal of the cover relative to the housing.

A cover latch mechanism usually includes hooks on the cover and grooves in the housing. The hooks can be hooked into the grooves, thus latching the cover to the housing. However, when removing the cover relative to the housing, a large amount of force is often required to be exerted on the cover. The cover may easily be damaged, thus the cover latch mechanism may fail.

Therefore, there is room for improvement within the art.

BRIEF DESCRIPTION OF THE DRAWINGS

Many aspects of the exemplary cover latch mechanism and a portable electronic device using the cover latch mechanism can be better understood with reference to the following drawings. These drawings are not necessarily drawn to scale, the emphasis instead being placed upon clearly illustrating the principles of the exemplary cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
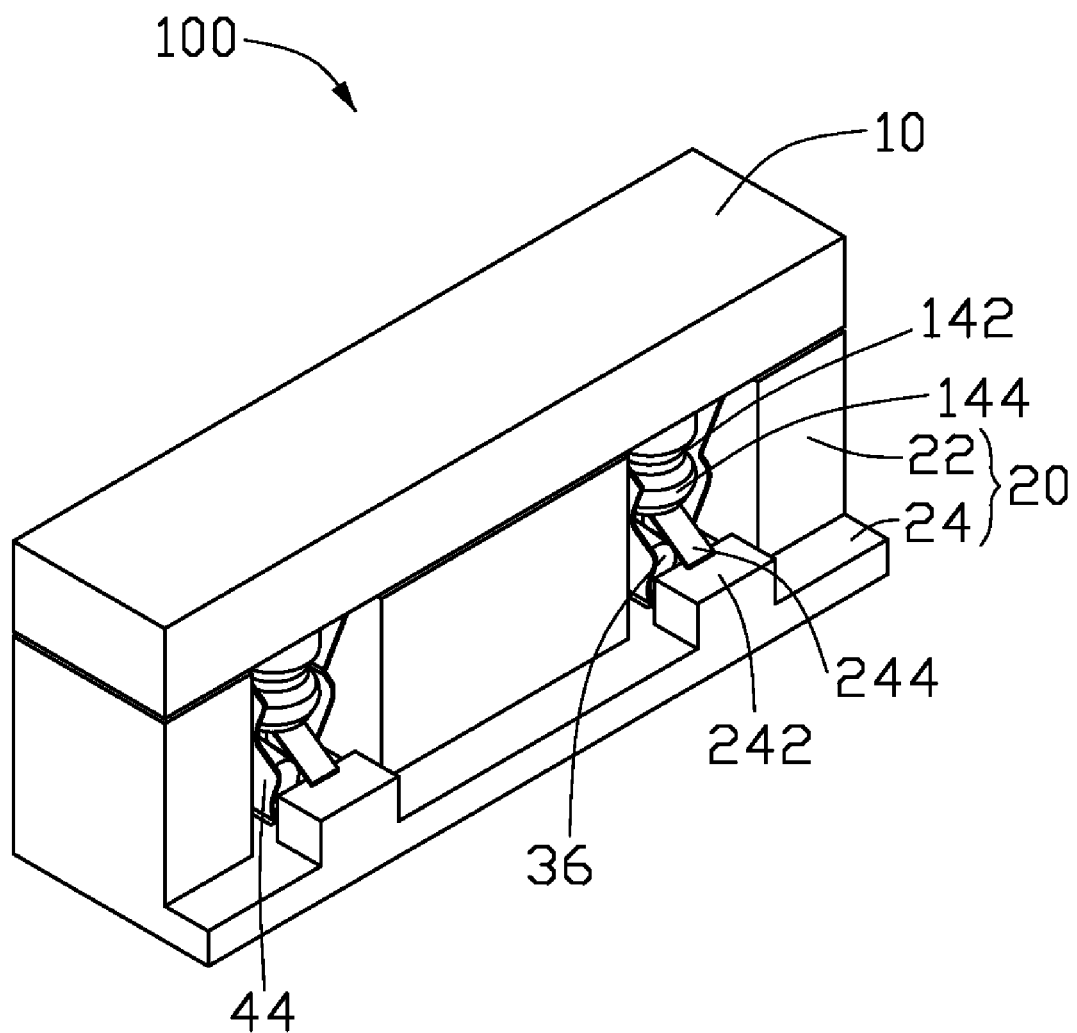
FIG. 1 is an isometric view of a cover latch mechanism at a latched state according to the exemplary embodiment.
Figure 2:
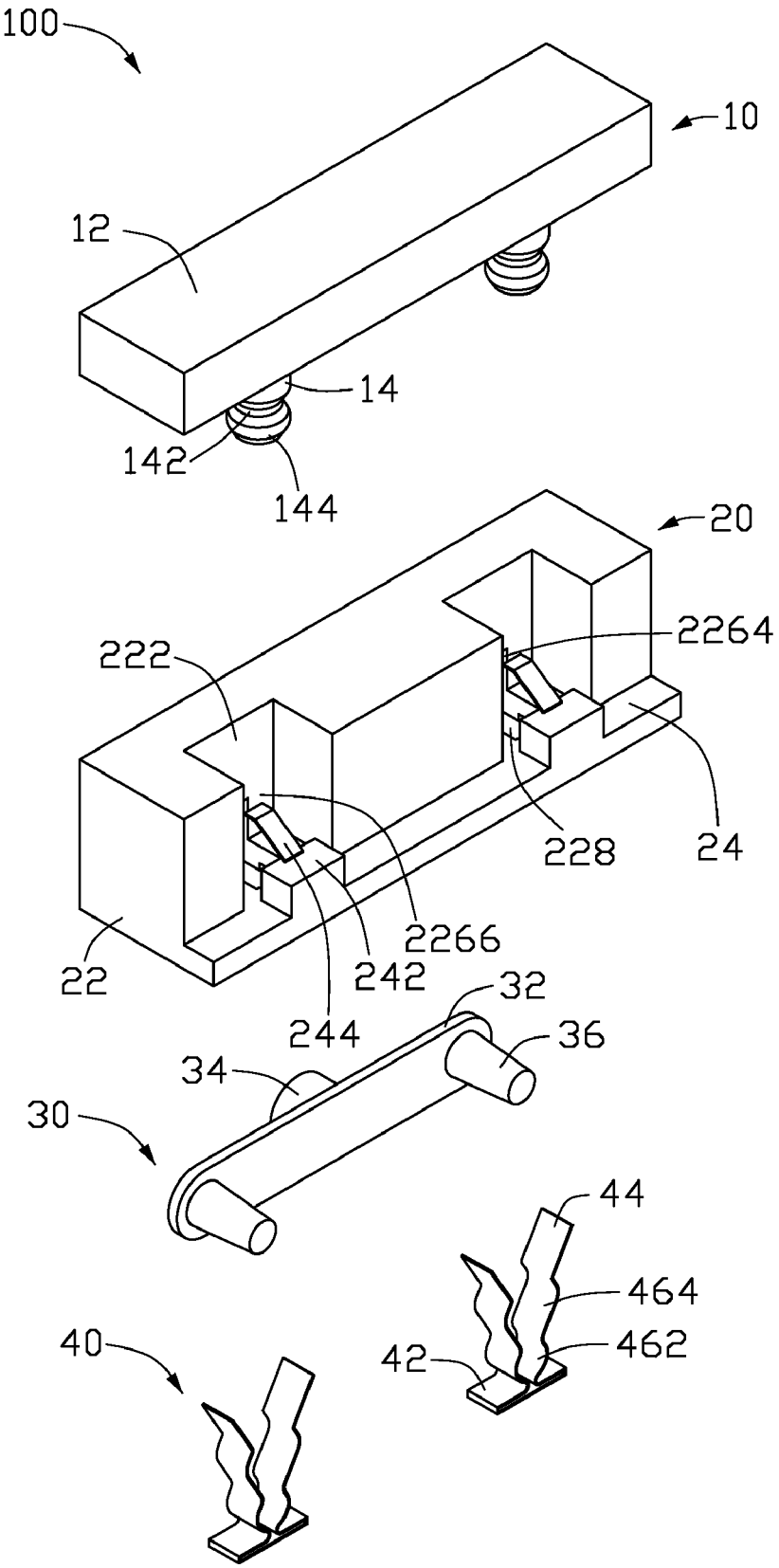
FIG. 2 is an exploded view relative to FIG. 1.

FIGS. 1 and 2 show a portion of an exemplary cover latch mechanism 100 suitably used in a portable electronic device (not labeled), such as a mobile phone. The cover latch mechanism 100 includes a cover member 10, a latching base 20, a releasing member 30, and two latching members 40. The cover member 10 can be latched to the latching base 20 by the latching members 40, and then be released from the latching base 20 by the releasing member 30. The cover member 10 can be a portion of a cover of the portable electronic device. The latching base 20 can be a portion of a housing of the portable electronic device. Thus, the cover member 10 may engage with and cover the latching base 20.

The cover member 10 includes a generally rectangular base portion 12 and two generally cylindrical latching protrusions 14. The latching protrusions 14 protrude from a same side surface of the base portion 12. The latching protrusions 14 each define a corresponding annual securing slit 142 adjacent to the end thereof connecting the base portion 12. The other opposite end of the latching protrusions 14 connecting the annual securing slit 142, is spherically shaped, and referred to as a latching end 144.

The latching base 20 is generally L-shaped including a base 22 and an extension board 24 extending from the base 22. The base 22 defines two generally rectangular grooves 222 enclosed by four connecting interior walls 2266. The grooves 222 are exposed to the outside for receiving the latching protrusions 14 in them. The extension board 24 extends two upward convex protrusions 242 proximate the grooves 222. The two convex protrusions 242 have two elastic sheets 244 securely attached thereto respectively. The elastic sheet 244 is attached to a top wall of the convex protrusion 242 and extends into the groove 222.

Figure 3:
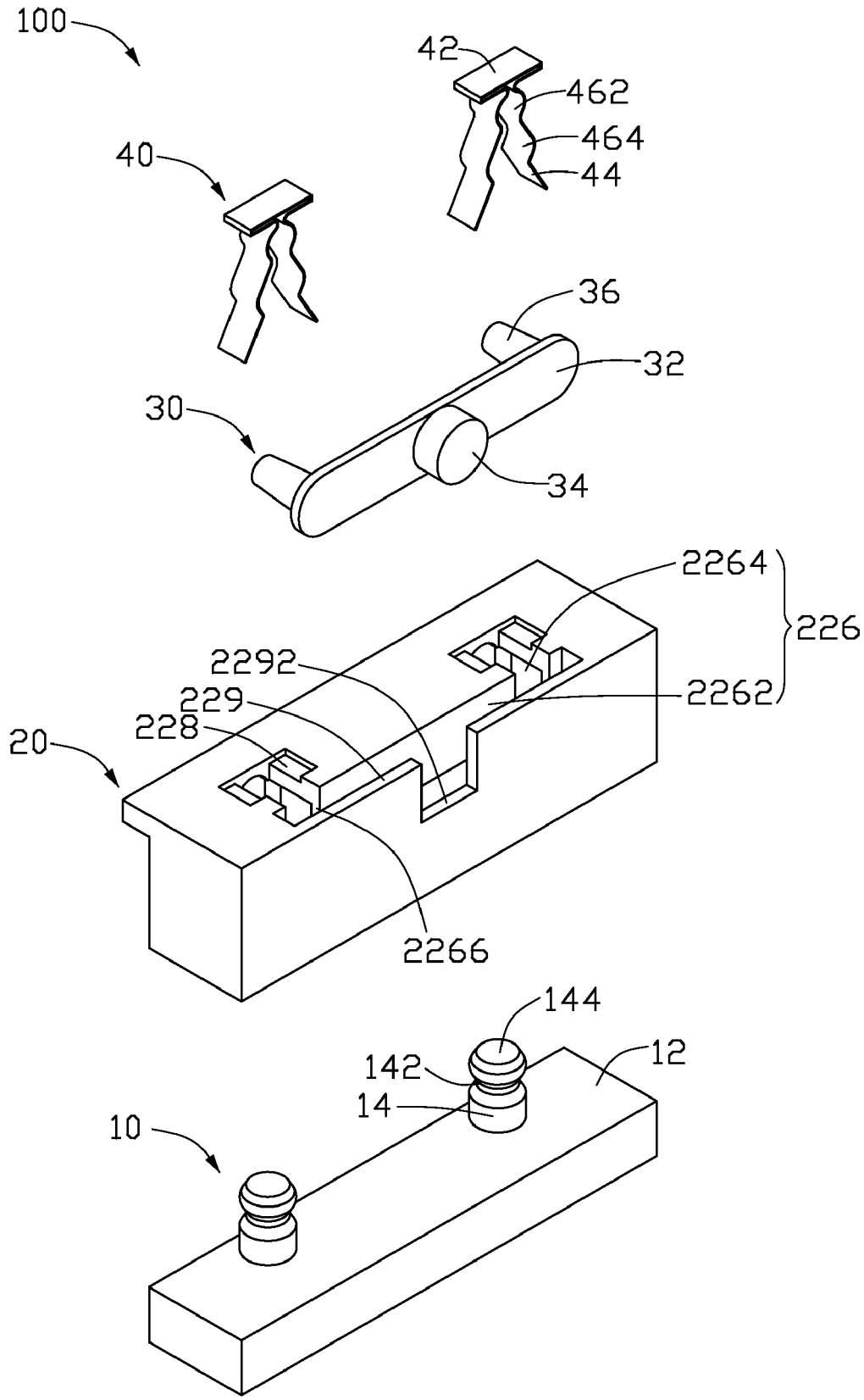
FIG. 3 is another exploded view relative to FIG. 1.

Referring also to FIG. 3, the latching base 20 also defines a releasing member cavity 226 and two latching member cavities 228. The releasing member cavity 226 and the latching member cavities 228 are used to accommodate the releasing member 30 and the latching member 40 respectively. The latching member cavities 228 are at middle of the latching base 20. The latching member cavities 228 are step-shaped passing through the interior walls 2266 to communicate with the grooves 222. The latching member cavities 228 are defined exposed to the outside to receive the latching members 40.

The releasing member cavity 226 is at a side of the latching base 20. The latching member cavities 228 communicate with each other by the releasing member cavity 226. The grooves 222 communicate with each other by the releasing member cavity 226. The releasing member cavity 226 includes a first cavity section 2262, two second cavity sections 2264, and a cutout 2292. The first cavity section 2262, the second cavity section 2264, and the cutout 2292 are defined exposed to the outside to receive the releasing member 30. The two second cavity sections 2264 communicate with the two latching member cavities 228. The cutout 2292 is defined in the edge 229 of the latching base 20 and communicates the first cavity section 2262.

The releasing member 30 is configured to be received and slidable in the releasing member cavity 226. The releasing member 30 has a main portion 32, an actuate portion 34, and two release portions 36. The actuate portion 34 and the two release portions 36 protrude on two opposite sides of the main portion 32, respectively. The main portion 32 is a flat board configured to be slidably received in the first cavity section 2262. The actuate portion 34 is generally cylindrical and configured to be slidably received in the cutout 2292. The two release portions 36 extend from the main portion 32 and are generally cylindrical round stages with their central diameters decreased along the extending direction. The two release portions 36 are configured to be slidably received in the two second cavity sections 2264.

Each latching member 40 is a flat sheet including a securing portion 42 and two latch portions 44. The securing portion 42 has substantially the same shape and size as the latching member cavity 228. The two latch portions 44 are elastic and wave-shaped to define a release space 462 and a latch space 464 therebetween. The release space 462 is more adjacent than the latch space 464 to the securing portion 42. The release space 462 communicates the latch space 464. The two latch portions 44 extend upwardly from the securing portion 42 in two opposite directions and, thus the latch space 464 is larger than the release space 462. The latch space 464 corresponds to the latching protrusion 14 and configured for latching the latching protrusion 14 in there. The release space 462 corresponds to the release portion 36 and configured for releasing the latching protrusion 14 from the latch space 464.

Figure 4:
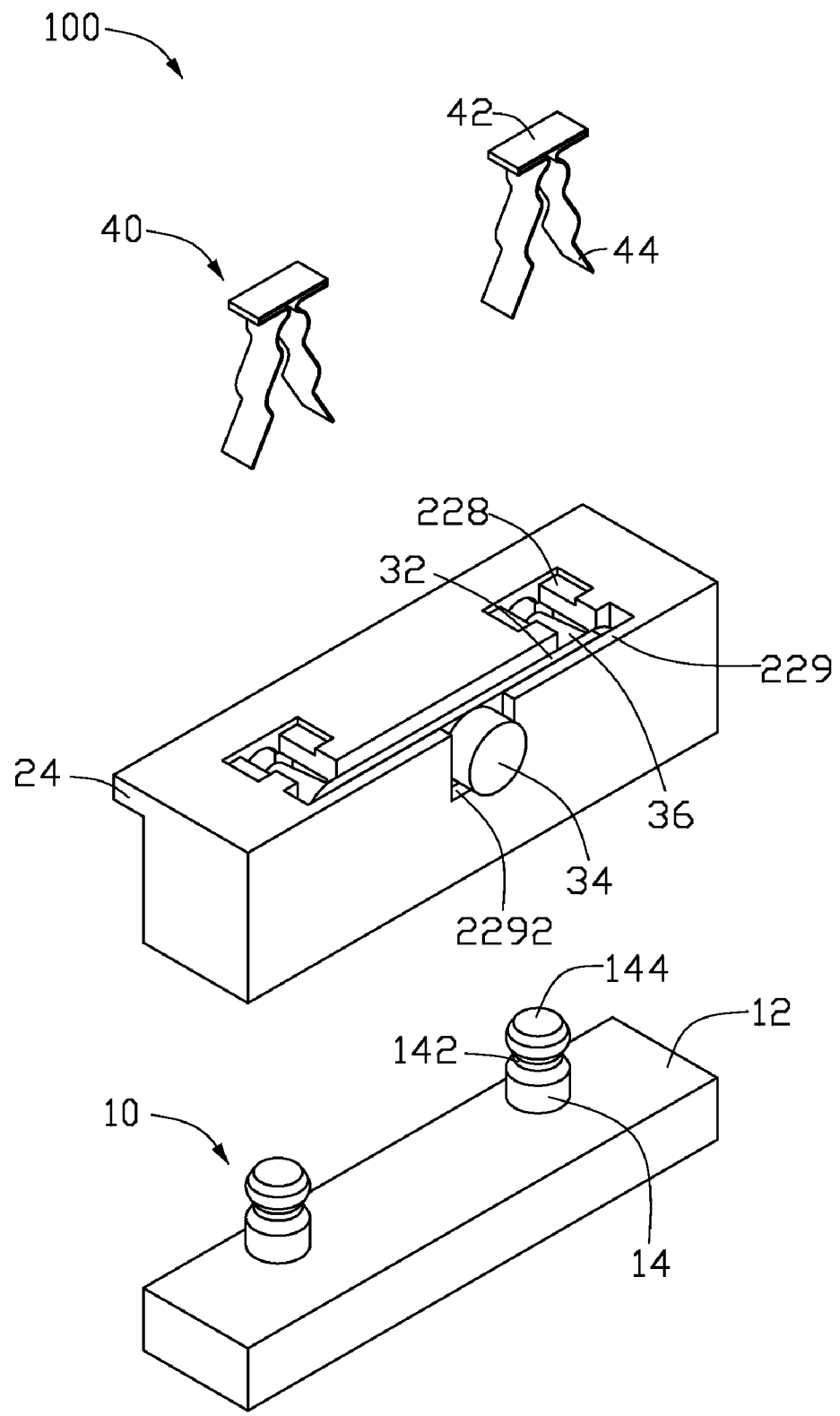
FIG. 4 is similar to FIG. 3 but showing an assembled state.

Referring also to FIG. 4, during assembly, the first cavity section 2262, the cutout 2292, the two second cavity sections 2264 receive the main portion 32, the actuate portion 34 and the two release portions 36, respectively. The latching members 40 are pressed and secured into the latching member cavities 228 and the grooves 222 (best shown in FIG. 1). The latch portions 44 resists against the edges of the latching member cavities 228, thereby securing the securing portions 42 in the latching member cavities 228. The release portions 36 engage into the release spaces 462, thereby securing the releasing member 30 in the releasing member cavity 226. The releasing member 30 can slide within the releasing member cavity 22.

Referring back to FIG. 1, the cover latch mechanism 100 is at a latched state. The cover member 10 engages with and covers the latching base 20. The latch spaces 464 receive and latch the latching ends 144 therein by the latch portions 44 being deformably and partially secured in the annual securing slits 142. The latching ends 144 resist and bias the elastic sheets 244.

When transferring the cover latch mechanism 100 from the latched state to a released state, the release portions 36 are pushed towards the convex protrusions 242. During this stage, the releasing member 30 slides within the releasing member cavity 22 along with the movement of the release portions 36. The release portions 36 engage further into the release spaces 462, thereby enlarging the release spaces 462. Accordingly, the latch spaces 464 are enlarged causing the latch portions 44 away from the securing slits 142. When the latch portions 44 move to a critical position relative to the securing slits 142, the elastic sheets 244 release their accumulated elastic force driving the latch portions 44 to detach from the securing slits 142. Correspondingly, the latching ends 144 release from the latch spaces 464. The cover latch mechanism 100 is at the released state.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover latching mechanism, comprising:
   a latching base comprising a convex protrusion and an elastic sheet attached to the convex protrusion;
   a cover member having a latching protrusion arranged thereon, the latching protrusion defining a securing slit and forms a latching end;
   a latching member configured for latching the cover member to the latching base, the latching member comprising two elastic latching portions symmetrically arranged to define a latch space and a release space directly communicating with the latch space; and
   a releasing member configured for releasing the cover member relative to the latching base, the cover member being latched to the latching base by latching the latching protrusion into the latch space, where the latching end of the latching protrusion latches in the latch space and the latch portions securely engage into the securing slit, the cover member being released from the latching base by the releasing member engaging into the release space, the elastic sheet configured for resisting against the latching end to remove the latching end from the latch space during the cover member being released from the latching base.

2. The cover latching mechanism as claimed in claim 1, wherein the latching base defines a releasing member cavity and a latching member cavity, the releasing member is slidably within the releasing member cavity, and the latching member is secured within the latching member cavity.

3. The cover latching mechanism as claimed in claim 2, wherein the latching member is a sheet comprising a securing portion, the securing portion secured in the latching member cavity, the two latch portions extending directly from the securing portion.

4. The cover latching mechanism as claimed in claim 3, wherein the two latch portions extend upwardly from the securing portion in two opposite directions.

5. The cover latching mechanism as claimed in claim 1, wherein the releasing member further comprises a main portion, the release portion extend from the main portion in an extending direction and provided with a decreased size along the extending direction.

6. A portable electronic device, comprising:
   a housing comprising a convex protrusion and an elastic sheet attached to the convex protrusion;
   a cover having a latching protrusion arranged thereon, the latching protrusion defining a securing slit and forms a latching end;
   a latching member configured for latching the cover to the housing, the latching member comprising two elastic latching portions symmetrically arranged to define a latch space and a release space directly communicating with the latch space; and
   a releasing member configured for releasing the cover relative to the housing, the cover being latched to the housing by latching the latching protrusion into the latch space, where the latching end of the latching protrusion latches in the latch space and the latch portions securely engage into the securing slit, the cover being released from the housing by the releasing member engaging into the release space, the elastic sheet configured for resisting against the latching end to remove the latching end from the latch space during the cover being released from the housing.

7. The portable electronic device as claimed in claim 6, wherein the housing defines a releasing member cavity and a latching member cavity, the releasing member is slidably within the releasing member cavity, and the latching member is secured within the latching member cavity.

8. The portable electronic device as claimed in claim 7, wherein the latching member is a sheet comprising a securing portion, the securing portion secured in the latching member cavity, the two latch portions extending directly from the securing portion.

9. The portable electronic device as claimed in claim 8, wherein the two latch portions extend upwardly from the securing portion in two opposite directions.

10. The portable electronic device as claimed in claim 6, wherein the releasing member further comprises a main portion, the release portion extend from the main portion in an extending direction and provided with a decreased size along the extending direction.

* * * * *